United States Patent Office.

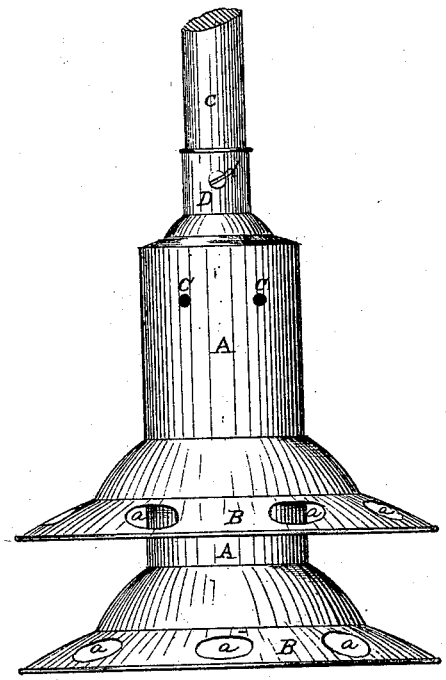

HENRY F. BARTLETT, OF LA GRANGE, MISSOURI.

Letters Patent No. 106,453, dated August 16, 1870.

IMPROVEMENT IN CHURN-DASHER.

The Schedule referred to in these Letters Patent and making part of the same.

*To all whom it may concern:*

Be it known that I, HENRY F. BARTLETT, of La Grange, in the county of Lewis and State of Missouri, have invented a new and improved Atmospheric Churn-Dasher; and I do hereby declare that the following is a full, clear, and exact description of the construction and operation of the same, reference being had to the accompanying drawing making a part of this specification, in which—

The figure in the drawing represents a side elevation.

My invention relates to an atmospheric churn-dasher, having flanges provided with holes, for agitating the milk, similar to that of B. M. Parks, patented March 24, 1868; and consists of a cylinder, provided with air-holes around the sides, and a socket on the top, to receive a handle, in combination with the flanges.

The object is to dispense with the valve and spring, as used by B. M. Parks, which are objectionable, because they interfere with a proper cleaning of the dasher, and, besides, the springs will corrode.

To enable others skilled in the art to make and use my invention, I will proceed to describe its construction and operation.

A is the cylinder, which is closed at the top and open at the bottom;

B B are the flanges; and

*a* are the holes. These flanges are arranged at a suitable distance apart, one above the other, and secured, in a proper manner, around the sides of the cylinder.

C are the air-holes, which are located at a sufficient distance below the top of the cylinder to permit of a vacuum being formed above them when the dasher is pressed down in the milk, so as to cause a suction or drawing-up of the milk in the cylinder when the dasher is raised up out thereof, thus agitating the milk almost as much in the upward as in the downward stroke, the flanges acting as an auxiliary, for increasing the agitation.

D is the socket, which consists of a short tube, suitably secured to the top of the cylinder, the handle *c* being inserted, and held therein by a screw, *d*, which is put through the tube into the wood.

Having thus fully described my invention,

What I claim therein as new, and desire to secure by Letters Patent, is—

The arrangement of cylinder A, provided with air-holes C, flanges B, and socket D, to receive handle *c*, substantially as and for the purpose set forth.

As evidence that I claim the foregoing as my invention, I have hereunto set my hand and seal in the presence of two witnesses.

HENRY F. BARTLETT. [L. S.]

Witnesses:
T. O. TOWLES,
Dr. J. A. HAY.